United States Patent
Miller et al.

(10) Patent No.: US 12,117,273 B2
(45) Date of Patent: Oct. 15, 2024

(54) METHOD AND DEVICE FOR GENERATING A THERMAL SIGNATURE

(71) Applicant: POLARIS SOLUTIONS LTD., Caesarea (IL)

(72) Inventors: Asaf Miller, Kibutz Metzer (IL); Itay Moshe, Modi'in (IL)

(73) Assignee: POLARIS SOLUTIONS LTD., Caesarea (IL)

( * ) Notice: Subject to any disclaimer, the term of this patent is extended or adjusted under 35 U.S.C. 154(b) by 384 days.

(21) Appl. No.: 17/765,444

(22) PCT Filed: Oct. 1, 2020

(86) PCT No.: PCT/IL2020/051072
§ 371 (c)(1),
(2) Date: Mar. 31, 2022

(87) PCT Pub. No.: WO2021/064733
PCT Pub. Date: Apr. 8, 2021

(65) Prior Publication Data
US 2022/0341711 A1    Oct. 27, 2022

(30) Foreign Application Priority Data
Oct. 2, 2019 (IL) ............................... 269762

(51) Int. Cl.
*F41H 3/00* (2006.01)
*G01J 5/48* (2022.01)

(52) U.S. Cl.
CPC . *F41H 3/00* (2013.01); *G01J 5/48* (2013.01)

(58) Field of Classification Search
CPC ......... B82Y 10/00; B82Y 30/00; B82Y 15/00; B82Y 20/00; B82Y 40/00; B82Y 99/00; F41H 3/00; H05B 2203/011; H05B 2203/017; H05B 2203/032; H05B 2214/04; H05B 3/00; H05B 3/009; H05B 3/10; H05B 3/26; H05B 3/54; H05B 2203/003; H05B 2203/005; H05B 2203/007;
(Continued)

(56) References Cited

U.S. PATENT DOCUMENTS

| | | |
|---|---|---|
| 8,911,859 B1 | 12/2014 | Spatcher |
| 2004/0238763 A1 | 12/2004 | Wood |

(Continued)

FOREIGN PATENT DOCUMENTS

| | | | |
|---|---|---|---|
| CN | 105428516 A1 | * | 3/2016 |
| DE | 202006008806 | * | 8/2006 |

*Primary Examiner* — Vy T Nguyen
(74) *Attorney, Agent, or Firm* — S. J. INTELLECTUAL PROPERTY; Avi Jencmen

(57) ABSTRACT

A thermal signature generating device, the device comprising: at least one thermal radiation emitting element, each of the at least one thermal radiation emitting elements extending between two spaced-apart opposite solid surfaces defined by two opposite electrodes and comprising an array of Carbon Nanotubes (CNTs), the array being connected by its two opposite ends to the two opposite electrodes, respectively, and extending along a space between the electrodes, the electrodes providing electrical current through the thermal radiation emitting element, causing the thermal radiation emitting element to emit thermal radiation for generating the thermal signature.

14 Claims, 10 Drawing Sheets

(58) Field of Classification Search
CPC ........ H05B 2203/013; H05B 2203/014; H05B
2203/034; H05B 3/14; H05B 3/145;
H05B 3/20; H05B 3/265; H05B 3/28;
H05B 3/286; H05B 3/34; H05B 3/46;
H05B 3/56; B29K 2105/16; B29K
2105/167; B29K 2995/0018; G01J 5/023;
G01J 5/02; G01J 5/024; G01J 5/0853;
G01J 5/10; G01J 5/20
USPC ....... 977/742, 950, 745, 750, 752, 902, 904;
165/185; 219/553, 534; 257/9; 438/57;
342/3
See application file for complete search history.

(56) References Cited

U.S. PATENT DOCUMENTS

| | | |
|---|---|---|
| 2007/0070579 A1 | 3/2007 | Sung |
| 2009/0096346 A1 | 4/2009 | Liu et al. |
| 2011/0180427 A1* | 7/2011 | Matsumoto ............ B82Y 30/00 |
| | | 205/792 |
| 2011/0236619 A1 | 9/2011 | Sansom et al. |
| 2012/0318129 A1* | 12/2012 | Jackson ................ B82Y 20/00 |
| | | 89/36.02 |
| 2013/0163725 A1* | 6/2013 | Hansen et al. |
| 2014/0111364 A1* | 4/2014 | Sjolund ................... F41H 3/00 |
| | | 165/185 |
| 2014/0270087 A1 | 9/2014 | Park et al. |
| 2015/0366463 A1* | 12/2015 | Naimi et al. |
| 2016/0099125 A1* | 4/2016 | Benke et al. |

* cited by examiner

1000

1004 — Providing electrical current through at least one thermal radiation emitting element, causing the at least one thermal radiation emitting element to emit thermal radiation for generating a thermal signature, wherein each of the at least one thermal radiation emitting elements extends between two spaced-apart opposite solid surfaces defined by two opposite electrodes and comprises an array of Carbon Nanotubes (CNTs), the array being connected by its two opposite ends to said two opposite electrodes, respectively, and extending along a space between the electrodes, the electrodes providing the electrical current through the thermal radiation emitting element

Fig. 10

METHOD AND DEVICE FOR GENERATING A THERMAL SIGNATURE

TECHNICAL FIELD

The invention relates to a method and device for generating a thermal signature.

BACKGROUND

References considered to be relevant as background to the presently disclosed subject matter are listed below. Acknowledgement of the references herein is not to be inferred as meaning that these are in any way relevant to the patentability of the presently disclosed subject matter.

United Kingdom Patent Application No. 2274154 (Ian Hunter), published on Jan. 4, 1995, discloses modifying a ship's infra-red appearance by determining the infra-red image of the ships surroundings and reflecting infrared radiation from its surroundings by reflector means pivotable about pivot points to cause the ship to merge into its surroundings. Because the reflector means are pivotable the way in which the ships infra-red appearance is modified can be controlled and the infra-red appearance can be made to correspond to the ships background when viewed along the line of sight of a likely threat, thus making it difficult to detect by a heat-seeking missile. The reflector means may be coated with bands of material translucent to infra-red radiation but opaque to visible radiation, to make it inconspicuous, and may comprise an inflatable envelope with a reflective surface.

PCT Patent Application No. 1996/004520 (Donald James Highgate), published on Feb. 15, 1996, discloses an apparatus for altering the IR characteristics of a body comprising a surface having at least two discrete areas possessing different IR characteristics, masking means for masking different portions of the surface, and controlling means for operating the masking means arranged such that operation of the controlling means alters the relative exposures of the two or more areas of the surface such as to impart desirable IR characteristics to an aspect of the body as detected from a remote point. In particular, an IR signaling apparatus comprising an inelastic surface composed of alternating low IR emissivity elements and high emissivity elements. The inner face of the surface is bonded to a body while the outer face is bonded to a polythene core which is divided into individual nitrogen-filled chambers. Masking means in the form of parallel inelastic strips are bonded to the outer face of the core. These strips have an inner side which is composed of low IR emissivity material and an outer side composed of medium to low IR emissivity material also colored in the visible. The apparatus is mounted on a body for signaling to a remote detector. The masking means is located above the surface so as to achieve a desired overall IR characteristic, and relative motion is introduced between the two at a known frequency. The detector is filtered at this frequency.

U.S. Pat. No. 5,036,211 (Owen S. Scott), published on Jul. 30, 1991, discloses a means of reflecting and emitting electromagnetic energy in an appropriate wavelength band comprising an arrangement of surfaces which are reflective to energy in that wavelength band and energy emitters having an emission of energy of such intensity that the combined reflection and emission of said surfaces match energy of a background in that wavelength band thereby camouflaging the surfaces. The said emitters comprise strips of material which, upon energizing with an electric current, become heated and radiate energy. The means further comprises at least one radiometer in association with a comparison means to provide an electrical signal which is a function of the difference between the combined reflection and emission and of the background, the electrical signal controlling the energization of the energy emitters.

U.S. Pat. No. 6,613,420 (Leupolz et al.), published on Sep. 2, 2003, discloses an infrared camouflage device having a surface structure with two groups of partial areas. Partial areas in the first group are directed downward and form an angle α of between 5° and 45° with vertical; and partial areas in the second group are directed upward and form an angle β of between 50° and 65° with vertical; and α+β<90°.

US Patent Application No. 2009/0252982 (O'Keefe et al.), published on Oct. 8, 2009, discloses a sheet of thermally reflective material having a surface texture comprising a plurality of reflecting elements, wherein each element has a first facet which is substantially reflective at thermal infrared wavelengths and wherein the respective first facets form an angle θ with the plane of the sheet (A-B))(0°<θ<90°. Preferably, the first facets are aligned such that, in use, thermal radiation is reflected from a common direction. By orienting the sheet of thermally reflective material to reflect cold regions of the sky, a marking material exhibiting a cold spot in a thermal imager can be provided.

"Applications of Liquid Crystals To Optical Camouflage Techniques In The Thermal Infrared Range", PhD proposition, taken from: https://www.telecom-bretagne.eu/data/Optique%20-%20PhD %20proposition.pdf on Nov. 11, 2018, discloses camouflage techniques corresponding to adaptation strategies to the surrounding environment. In conflict zones, these strategies allow a soldier or a vehicle to gain a decisive advantage over the enemy. In addition to the mimicry in the visible spectrum, we should also able to control the reflected infrared IR radiance (thermal signature), in order not to be detected by observing systems, such as infrared cameras. A solution for this issue is the use of elements with a controlled IR reflection, which allows to mitigate this signature. Liquid crystal materials have compatibilities with this function through its electrooptic properties. The objective is to study the possibilities to control the reflectivity of a liquid crystal cell in the infrared spectrum. Three mechanisms using liquid crystal are identified.

US Patent Application No. 2014/0125506 (Peder Sjölund), published on May 8, 2014, discloses a device for signature adaptation, comprising at least one surface element arranged to assume a determined thermal distribution, wherein said surface element comprises at least one temperature generating element arranged to generate at least one predetermined temperature gradient to a portion of said at least one surface element. Said at least one surface element comprises at least one radar suppressing element, wherein said at least one radar suppressing element is arranged to suppress reflections of incident radio waves. The invention also concerns an object provided with a device for signature adaptation.

U.S. Pat. No. 6,338,292 (Reynolds et al.), published on Jan. 15, 2002, discloses camouflage in both the visual spectrum and the infrared spectrum by emulating the infrared radiation of an object's background and the visible radiation of an object's background, effectively cloaking the object from detection. Initially, the temperature and color of the background against which an object appears is determined. The external surface of the object, or alternatively a shield around the object, is then heated or cooled using thermoelectric modules that convert electrical energy into a temperature gradient. The ability of the modules to be either cooled or heated permits the output of the modules to be altered to match the temperature of an object's background. In combination with these thermocouples, the invention utilizes choleric liquid crystals to alter the visible color of an object. Since the visible color of choleric liquid crystals can be changed with temperature, the heating and cooling ability of the thermocouples can be used to adjust the color of the liquid crystals to match the object's background color.

U.S. Pat. No. 9,952,020 (Rene Schwarz), published on Apr. 24, 2018, discloses a method for visually adaptively camouflaging objects, the background and/or the surroundings in front of which and/or in which the object is situated are/is detected by means of a camera or a sensor array. The background and/or the surroundings thus detected are/is reproduced as an image in a device for camouflaging the object.

PCT Patent Application No. 2011/000679 (Rene Schwarz), published on Jan. 6, 2011, discloses a system for the adaptive camouflage of objects, particularly of vehicles, at least one panel-like layer is provided, which is at least partially air-permeable. The air suctioned in from the surroundings can be controlled, before or while it is fed into the layer, to a temperature that is determined at least almost from the background of the object.

"Adaptive Camouflage Techniques for A Light Armored Vehicle" (Wheaton, V., Vincent, I. and Dumas, J.) published in 2010, Land Warfare Conference, discloses that camouflage has historically been an important survivability technique for battlefield platforms, installations and personnel. In World War I, camouflage was developed as handcrafted disruptive patterns, unique to each soldier, platform or installation. World War II saw the development of industrially produced patterned camouflage textiles for uniforms and nets. The modern battlefield presents new challenges for the traditional methods of camouflage. Modern sensors are able to resolve very small differences between targets and background, and a traditional static camouflage solution will only maintain a close enough match to its environment if the environment also remains static. To maintain low detectability in a changing environment, camouflage systems must adapt. This research demonstrates concepts of adaptive camouflage for a light armored vehicle (a Canadian Coyote) in a desert environment. Three techniques are investigated. A heat shield cover to reduce thermal signature and solar heat transfer into the vehicle, electro-chromic cells to simulate a chameleon-like behavior in the visual spectrum, and active thermal cells to create dynamic disruptive thermal patterns on the heat shield. The overall objective is to create a system to reduce conspicuity across the visual and infrared spectrum by disrupting the vehicle silhouette and minimizing the difference between the background and vehicle characteristics. This paper presents results from recent proof-of-concept testing.

"Fast Adaptive Thermal Camouflage Based On Flexible Vo2/Graphene/Cnt Thin Films" (Xiao, L., Ma, H., Liu, J., Zhao, W., Jia, Y, Zhao, Q., Liu, K, Wu, Y, Wei, Y, Fan, S. and Jiang, K) published in 2015, Nano letters, 15(12), pp. 8365-8370, discloses that adaptive camouflage in thermal imaging, a form of cloaking technology capable of blending naturally into the surrounding environment, has been a great challenge in the past decades. Emissivity engineering for thermal camouflage is regarded as a more promising way compared to merely temperature controlling that has to dissipate a large amount of excessive heat. However, practical devices with an active modulation of emissivity have yet to be well explored. The publication demonstrates an active cloaking device capable of efficient thermal radiance control, which consists of a vanadium dioxide (VO2) layer, with a negative differential thermal emissivity, coated on a graphene/carbon nanotube (CNT) thin film. A slight joule heating drastically changes the emissivity of the device, achieving rapid switchable thermal camouflage with a low power consumption and excellent reliability.

US Patent Application No. 2012/0318129 (Jackson et al.), published on Dec. 20, 2012, discloses a camouflage material comprising an electromagnetic energy (EME) absorbing layer comprising an array of carbon nanotubes and a plurality of energy transmitting elements embedded within the absorbing material. The energy transmitting elements are operative to convey energy to at least a portion of an outer surface of the absorbing layer.

GENERAL DESCRIPTION

In accordance with a first aspect of the presently disclosed subject matter, there is provided a thermal signature generating device, the device comprising: at least one thermal radiation emitting element, each of the at least one thermal radiation emitting elements extending between two spaced-apart opposite solid surfaces defined by two opposite electrodes, and comprising an array of Carbon Nanotubes (CNTs), the array being connected by its two opposite ends to the two opposite electrodes, respectively, and extending along a space between the electrodes, the electrodes providing electrical current through the thermal radiation emitting element, causing the thermal radiation emitting element to emit thermal radiation for generating the thermal signature.

In some cases, a majority of a surface area of the thermal radiation emitting element is not in contact with any solid surface.

In some cases, the array of CNTs is configured with an aspect ratio between cross-sectional dimensions of two surface regions of the two electrodes on which the ends of the array are mounted and a length of the array defined by the space between the electrodes, the cross sectional dimension of each of the two surface regions being larger than the space between the electrodes.

In some cases, the electrical current through the thermal radiation emitting element flows along a direction between the electrodes in alignment with the lengths of fibers of the CNTs.

In some cases, the electrodes are configured to serve as heat sinks for removing heat generated by the thermal radiation emitting element.

In some cases, the device further comprises a control unit configured and operable to generate control signals to control the electrical current through said at least one thermal radiation emitting element in accordance with the thermal signature to be generated, the control signals having a predetermined pattern corresponding to at least a predetermined temporal modulation of the electrical current.

In some cases, the device further comprises a housing comprising the electrodes and the thermal radiation emitting element, and wherein at least part of the housing enables thermal radiation passage therethrough.

In some cases, the housing further comprises at least one heat sink for removing heat generated by the thermal radiation emitting element.

In some cases, the housing provides a vacuumed environment for the thermal radiation emitting element.

In some cases, the at least part of the housing that enables thermal radiation passage therethrough is made of one or more of the following materials: germanium, Teflon, silicon, zinc selenide or polyethylene.

In some cases, a shape of the thermal radiation emitting element is a flat surface, and the housing comprises a marking instructing a user of a connection direction of connecting the housing to a fuse holder for providing thermal radiation at desired directions.

In some cases, the thermal radiation emitting element has one of the following shapes: a spiral, a cylinder, a fiber or a flat surface.

In some cases, the housing is shaped as a fuse enabling detachably connecting the housing to a fuse holder.

In some cases, the housing and the fuse holder meet the DIN 72581 standard.

In some cases, the fuse holder is capable of providing the electrical current to the electrodes.

In some cases, the fuse holder comprises a reflector for directing the thermal radiation towards desired directions.

In some cases, the fuse holder is connected to a reflective surface for reflecting the thermal radiation towards desired directions.

In some cases, upon connecting the housing to the fuse holder, the housing is located within a substrate of the reflective surface, the substrate being designed to reflect the thermal radiation towards the desired directions.

In some cases, the device further comprises a male connector enabling detachably connecting the device to a female connector irrespective of an angle of rotation of the male connector around an axis of the male connector perpendicular to the female connector.

In some cases, the at least one thermal radiation emitting element is a plurality of thermal radiation emitting elements, wherein each thermal radiation emitting element of the plurality of thermal radiation emitting elements emits thermal radiation in a given direction, so that at least one of the thermal radiation emitting elements emits first thermal radiation in a first direction and at least another one of the thermal radiation emitting elements emits second thermal radiation in a second direction, other than the first direction.

In some cases, the pattern is a pre-defined pattern.

In some cases, the thermal signature is generated for marking one or more objects.

In some cases, the device further comprises a thermographic camera capable of determining a heatmap of an area of interest, and the pattern is generated to match the heatmap.

In some cases, the pattern is generated in order to camouflage an object located between a viewer and the area of interest.

In accordance with a second aspect of the presently disclosed subject matter, there is provided a thermal signature generating method, the method comprising: providing electrical current through at least one thermal radiation emitting element, causing the at least one thermal radiation emitting element to emit thermal radiation for generating a thermal signature, wherein each of the at least one thermal radiation emitting elements extends between two spaced-apart opposite solid surfaces defined by two opposite electrodes and comprises an array of Carbon Nanotubes (CNTs), the array being connected by its two opposite ends to the two opposite electrodes, respectively, and extending along a space between the electrodes, the electrodes providing the electrical current through the thermal radiation emitting element.

In some cases, a majority of a surface area of the thermal radiation emitting element is not in contact with any solid surface.

In some cases, the array of CNTs is configured with an aspect ratio between cross-sectional dimensions of two surface regions of the two electrodes on which the ends of the array are mounted and a length of the array defined by the space between the electrodes, the cross sectional dimension of each of the two surface regions being larger than the space between the electrodes.

In some cases, the electrical current through the thermal radiation emitting element flows along a direction between the electrodes in alignment with the lengths of fibers of the CNTs.

In some cases, the electrodes are configured to serve as heat sinks for removing heat generated by the thermal radiation emitting element.

In some cases, the method further comprises: generating control signals to control the electrical current through the at least one thermal radiation emitting element in accordance with the thermal signature to be generated, the control signals having a predetermined pattern corresponding to at least a predetermined temporal modulation of the electrical current.

In some cases, the electrodes and the thermal radiation emitting element are included within a housing, and wherein at least part of the housing enables thermal radiation passage therethrough.

In some cases, the method further comprises: removing heat, generated by the thermal radiation emitting element, by at least one heat sink of the housing.

In some cases, the housing provides a vacuumed environment for the thermal radiation emitting element.

In some cases, the at least part of the housing that enables thermal radiation passage therethrough is made of one or more of the following materials: germanium, Teflon, silicon, zinc selenide or polyethylene.

In some cases, a shape of the thermal radiation emitting element is a flat surface, and the housing comprises a marking instructing a user of a connection direction of connecting the housing to a fuse holder for providing thermal radiation at desired directions.

In some cases, the thermal radiation emitting element has one of the following shapes: a spiral, a cylinder, a fiber or a flat surface.

In some cases, the housing is shaped as a fuse enabling detachably connecting the housing to a fuse holder.

In some cases, the housing and the fuse holder meet the DIN 72581 standard.

In some cases, the electrical current is provided to the electrodes by the fuse holder.

In some cases, the fuse holder comprises a reflector for directing the thermal radiation towards desired directions.

In some cases, the fuse holder is connected to a reflective surface for reflecting the thermal radiation towards desired directions.

In some cases, upon connecting the housing to the fuse holder, the housing is located within a substrate of the reflective surface, the substrate being designed to reflect the thermal radiation towards the desired directions.

In some cases, the at least one thermal radiation emitting element is a plurality of thermal radiation emitting elements, wherein each thermal radiation emitting element of the plurality of thermal radiation emitting elements emits thermal radiation in a given direction, so that at least one of the thermal radiation emitting elements emits first thermal radiation in a first direction and at least another one of the thermal radiation emitting elements emits second thermal radiation in a second direction, other than the first direction.

In some cases, the pattern is a pre-defined pattern.

In some cases, the thermal signature is generated for marking one or more objects.

In some cases, a thermographic camera is capable of determining a heatmap of an area of interest, and the pattern is generated to match the heatmap.

In some cases, the pattern is generated in order to camouflage an object located between a viewer and the area of interest.

In accordance with a third aspect of the presently disclosed subject matter, there is provided a non-transitory computer readable storage medium having computer readable program code embodied therewith, the computer readable program code, executable by a controller of a computer to perform a thermal signature generating method, the method comprising: providing electrical current through at least one thermal radiation emitting element, causing the at least one thermal radiation emitting element to emit thermal radiation for generating a thermal signature, wherein each of the at least one thermal radiation emitting elements extends between two spaced-apart opposite solid surfaces defined by two opposite electrodes and comprises an array of Carbon Nanotubes (CNTs), the array being connected by its two opposite ends to the two opposite electrodes, respectively, and extending along a space between the electrodes, the electrodes providing the electrical current through the thermal radiation emitting element.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 10 is a flowchart illustrating an example of a method for generating a thermal signature, in accordance with the presently disclosed subject matter.

DETAILED DESCRIPTION

Figure 1:
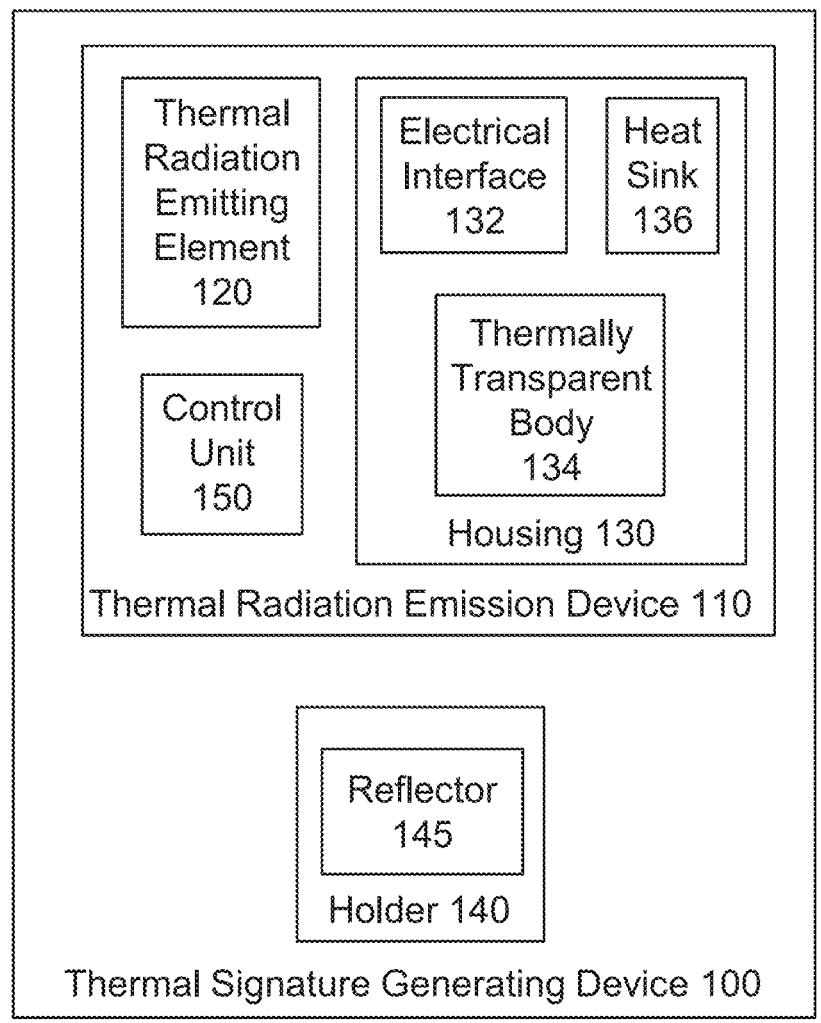
FIG. 1 is a block diagram schematically illustrating one example of a thermal signature generating device, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "generating", "receiving", "emitting", "removing", "connecting", "instructing", "directing", "reflecting", "controlling" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 10 may be executed. FIGS. 1 to 9B illustrate general schematics of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of a thermal signature generation unit that constitutes thermal signature generating device 100, in accordance with the presently disclosed subject matter.

In accordance with the presently disclosed subject matter, thermal signature generating device 100 can be configured to generate a thermal signature.

Thermal signature generating device 100 can be configured to include a thermal radiation emission device 110. Thermal radiation emission device 110 can be configured to include at least one thermal radiation emitting element 120. In some cases, thermal radiation emission device 110 can be configured to include one thermal radiation emitting element 120, as illustrated in FIG. 1. Alternatively, in some cases, thermal radiation emission device 110 can include a plurality of thermal radiation emitting elements 120, as detailed further herein, inter alia with reference to FIGS. 8A, 8B, 9A and 9B.

Each of the at least one thermal radiation emitting elements 120 can be configured to extend between two spaced-apart opposite solid surfaces defined by two opposite electrodes. Moreover, each of the at least one thermal radiation emitting elements 120 can be connected by its two opposite ends to the two opposite electrodes, respectively, and can extend along a space between the electrodes, as detailed further herein, inter alia with reference to FIGS. 3, 6A, 6B, 7A, 7B, 8A, 8B, 9A and 9B.

In some cases, each of the at least one thermal radiation emitting elements 120 can comprise an array of Carbon Nanotubes (CNTs), the array being connected by its two opposite ends to two opposite electrodes, respectively, between which the respective thermal radiation emitting element 120 extends, and extending along the space between the electrodes, as detailed further herein, inter alia with reference to FIGS. 3, 6A, 6B, 7A, 7B, 8A, 8B, 9A and 9B. Additionally, or alternatively, in some cases, each of the at least one thermal radiation emitting elements 120 can be manufactured from one or more of: stainless steel, aluminum or nickel. In some cases, each of the at least one thermal radiation emitting elements 120 can be one or more resistors. In some cases, each of the at least one thermal radiation emitting elements 120 can be configured to have one of the following shapes: a spiral, a cylinder, a fiber or a flat surface.

In some cases, a majority of a surface area of each of the at least one thermal radiation emitting elements 120 is not in contact with any solid surface, as detailed further herein, inter alia with reference to FIGS. 3, 6A, 6B, 7A, 7B, 8A, 8B, 9A and 9B.

In some cases, as detailed further herein, inter alia with reference to FIGS. 6A, 6B, 7A, 7B, 8A, 8B, 9A and 9B, the array of CNTs can be configured with an aspect ratio between cross-sectional dimensions of two surface regions of the two electrodes on which the ends of the array are mounted and a length of the array defined by the space between the electrodes, the cross sectional dimension of each of the two surface regions being larger than the space between the electrodes.

Thermal radiation emission device 110 can be further configured to include a housing 130 that holds one or more of the thermal radiation emitting elements 120, as detailed further herein, inter alia with reference to FIGS. 3, 6A, 6B, 7A, 7B, 8A, 8B, 9A and 9B. In some cases, thermal radiation emitting elements 120 can be included within housing 130, as detailed further herein, inter alia with reference to FIGS. 3 and 5.

Housing 130 can be configured to include an electrical interface 132. Electrical interface 132 can be configured to include, for each of the at least one thermal radiation emitting elements 120, the two opposite electrodes between which the respective thermal radiation emitting element 120 extends and two electrical connections that are connected to the two opposite electrodes, respectively. Non-limiting examples of an electrical interface 132 are provided further herein, inter alia with reference to FIGS. 2, 3, 6B, 7B, 8A, 8B and 9B. Electrical interface 132 can be configured to receive an electrical current. The electrodes of the electrical interface 132 that are associated with a respective thermal radiation emitting element 120 can provide electrical current through the thermal radiation emitting element 120, causing the thermal radiation emitting element 120 to emit thermal radiation for generating the thermal signature.

In some cases, in which each of the at least one thermal radiation emitting elements 120 comprises an array of CNTs, the electrical current through a respective thermal radiation emitting element 120 can flow along a direction between the electrodes associated with the respective thermal radiation emitting element 120, in alignment with the lengths of fibers of the CNTs.

In some cases, housing 130 can be further configured to include at least one thermally transparent body 134, being at least part of the housing 130 and enabling thermal radiation passage therethrough. In some cases, the at least one thermally transparent body 134 can be made of one or more of the following materials: germanium, Teflon, silicon, zinc selenide or polyethylene. A non-limiting example of the at least one thermally transparent body 134 is a thermally transparent sleeve, as detailed further herein, inter alia with reference to FIGS. 2 and 3.

In some cases, housing 130 can also be configured to include at least one heat sink 136 for removing heat generated by thermal radiation emitting element 120. In some cases, the at least one heat sink 136 can include a first pair of heat sinks and a second pair of heat sinks, as detailed further herein, inter alia with reference to FIGS. 2 and 3. In some cases, the electrodes can be configured to serve as heat sinks for removing heat generated by the thermal radiation emitting element, as detailed further herein, inter alia with reference to FIGS. 6B, 7B, 8A, 8B and 9B.

Figure 3:
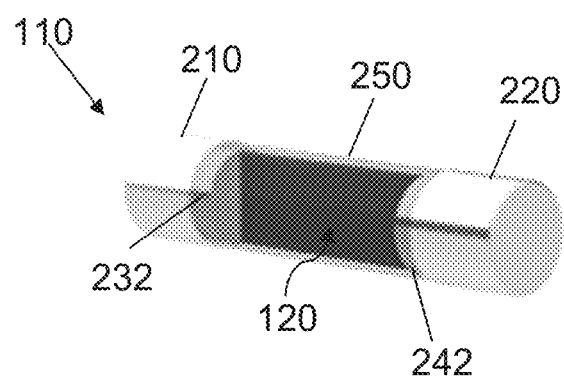
FIG. 3 is a schematic illustration of one example of a thermal radiation emission device, in accordance with the presently disclosed subject matter.

In some cases, housing 130 can be configured to surround thermal radiation emitting element 120, as detailed further herein, inter alia with reference to FIG. 3. Additionally, in some cases, housing 130 can be configured to provide a vacuumed environment for thermal radiation emitting element 120.

In some cases, housing 130 can be shaped as a cylindrical fuse (such a housing 130 is referred to hereinafter as a "fuse-shaped housing"). A non-limiting example of a fuse-shaped housing 130 is detailed further herein, inter alia with reference to FIGS. 2 and 3. By shaping the housing as a cylindrical fuse, the housing can be detachably connected to a fuse holder 140, as detailed below.

Thermal signature generating device 100 can be configured to include a control unit 150. Control unit 150 can be configured and operable to generate control signals to control the electrical current through the at least one thermal radiation emitting element 120 in accordance with the thermal signature to be generated, the control signals having a predetermined pattern corresponding to at least a predetermined temporal modulation of the electrical current.

In some cases, thermal radiation emission device 110 can be configured to include a control unit 150, as detailed further herein, inter alia with reference to FIGS. 4, 6A, 7A, 8A and 9A. Alternatively, in some cases, in which thermal signature generating device 100 is configured to include a plurality of thermal radiation emission devices 110, thermal signature generating device 110 can be configured to include a control unit 150 that is associated with the plurality of thermal radiation emission devices 110.

In some cases in which thermal signature generating device 100 includes a plurality of thermal radiation emitting devices 110, and accordingly a corresponding plurality of thermal radiation emitting elements 120, each thermal radiation emitting element 120 of the plurality of thermal radiation emitting elements 120 can be configured to emit thermal radiation in a given direction, so that at least one of the thermal radiation emitting elements 120 emits first thermal radiation in a first direction and at least another one of the thermal radiation emitting elements 120 emits second thermal radiation in a second direction, other than the first direction.

In some cases, the generation of the control signals to control the electrical current through the at least one thermal radiation emitting element 120 can be performed by a user of the thermal signature generation unit 100, for example, by the user manually opening and closing a switch.

Figure 4:
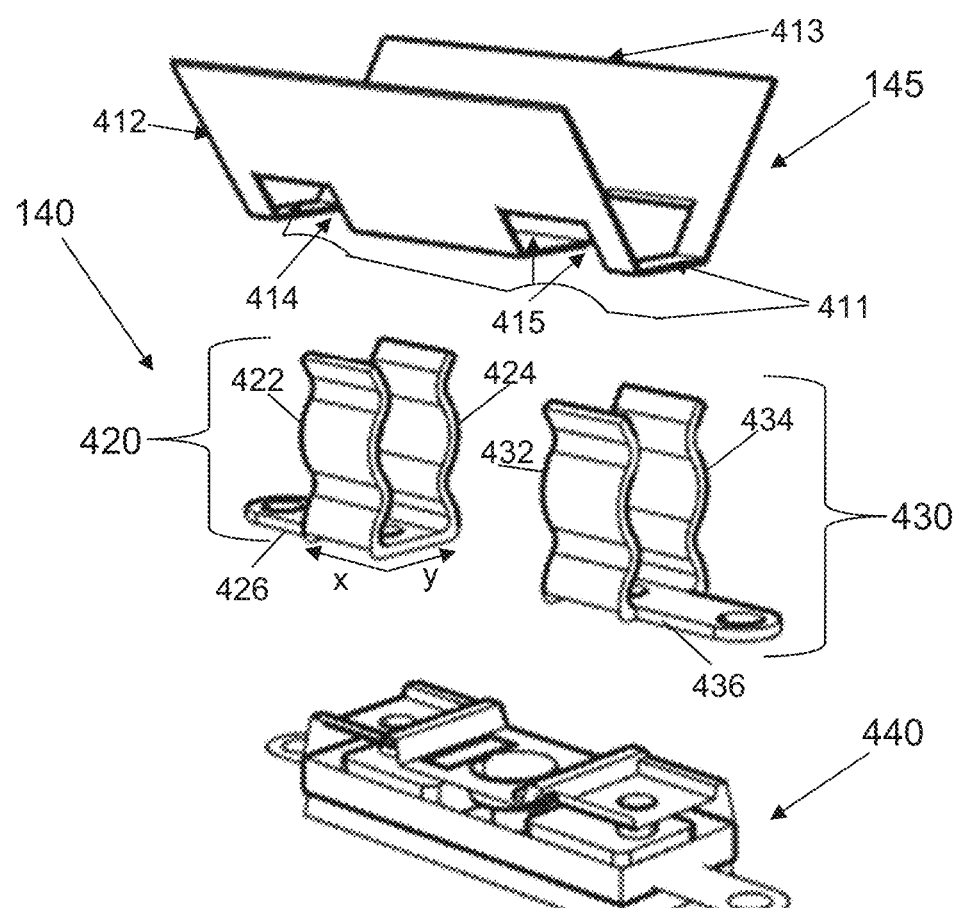
FIG. 4 is a schematic illustration of one example of components of a holder that is configured to hold a thermal radiation emission device, in accordance with the presently disclosed subject matter.
Figure 5:
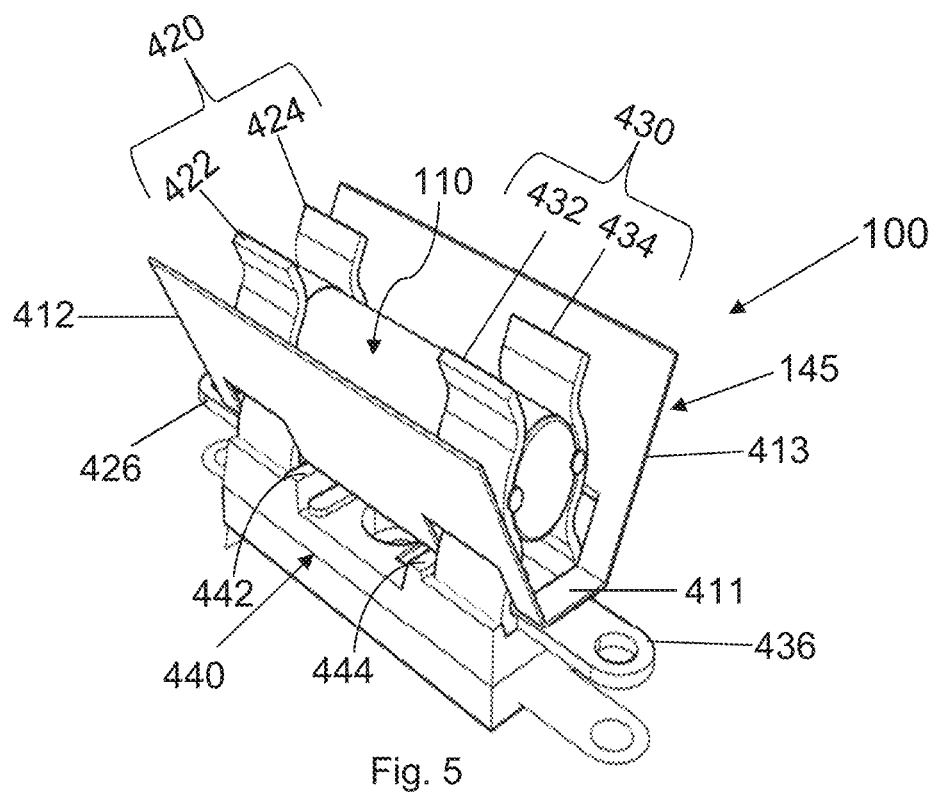
FIG. 5 is a schematic illustration of one example of a thermal signature generating device, in accordance with the presently disclosed subject matter.

In some cases, thermal signature generating device 100 can be configured to include a holder 140 for holding thermal radiation emission device 110, as detailed further herein, inter alia with reference to FIGS. 4 and 5. In some cases, holder 140 can be configured to include a reflector 145, as detailed further herein, inter alia with reference to FIGS. 4 and 5.

In some cases, the thermal signature to be generated by thermal signature generating device 100 can be a pattern. Moreover, in some cases, control unit 150 can be configured and operable to generate the control signals to control the electric current through the at least one thermal radiation emitting element 120 in accordance with the pattern. In some cases, the pattern can be a pre-defined pattern.

In some cases, the thermal signature can be generated for marking one or more objects, e.g. in accordance with a pre-defined pattern. In some cases, due to the capability of the at least one thermal radiation emitting elements 120 to cool off rapidly, in accordance with the structure of the one or more thermal radiation emission devices 110 that include the at least one thermal radiation emitting elements 120, as detailed further herein, inter alia with respect to FIGS. 3, 6A, 6B, 7A, 7B, 8A, 8B, 9A and 9B, the at least one thermal radiation emitting elements 120 can be configured to alternate between conducting electrical current (i.e., being turned on) and not conducting electrical current (i.e., resting) at a high rate. This can enable the thermal signature generating device 100 to emit thermal radiation at a high pulse rate for marking the one or more objects. For example, in order to mark the one or more objects with a maximum energy efficiency, the at least one thermal radiation emitting element 120 can conduct electrical current for about one one-hundredth of a second at a temperature of about 400° C. and not conduct electrical current for about one second. It is to be noted that the thermal radiation emitting element 120 can be capable of cooling off from 400° C. in as little time as $\frac{1}{100}$ of a second.

In some cases, thermal signature generating device 100 can be configured to further include a thermographic camera (not shown in FIG. 1) that is capable of determining a heatmap of an area of interest, and wherein the pattern (i.e., the thermal signature) is generated to match the heatmap. In some cases, the pattern can be generated to match the heatmap in order to camouflage an object located between a viewer and the area of interest. In some cases, at least one thermal radiation emitting element 120 can be heated continuously at a temperature between approximately 40° C. and 120° C. in order to camouflage an object.

Figure 2:
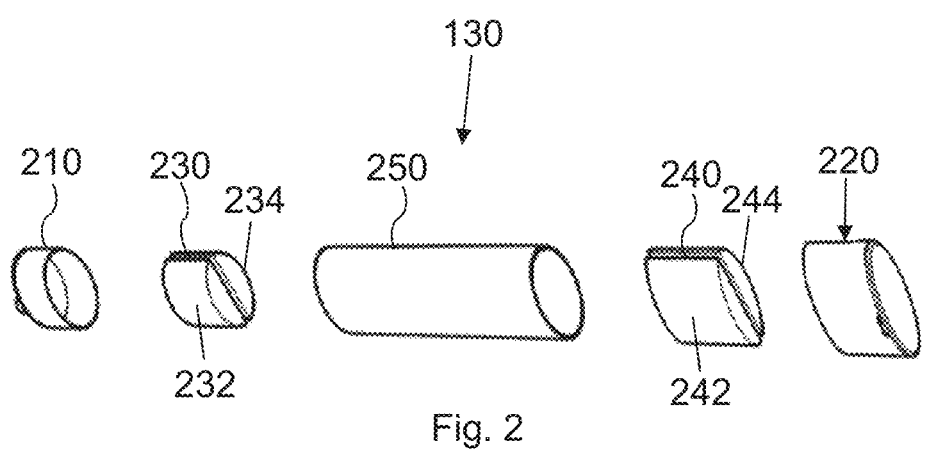
FIG. 2 is a schematic illustration of one example of components of a fuse-shaped housing configured to hold a thermal radiation emitting element, in accordance with the presently disclosed subject matter.

Attention is now drawn to FIG. 2, a schematic illustration of one example of components of a fuse-shaped housing 130 configured to hold thermal radiation emitting element 120, in accordance with the presently disclosed subject matter.

In accordance with the presently disclosed subject matter, the components of the fuse-shaped housing 130 can be configured to include (non-limiting): a first cap 210, a second cap 220, a first pair of heat sinks 230, a second pair of heat sinks 240, and a thermally transparent sleeve 250.

In some cases, first cap 210 can be of a cylindrical shape and configured to seal the fuse-shaped housing 130 at a first longitudinal end thereof. In some cases, first cap 210 can also be configured to include a first electrical contact constituting a first electrode of electrical interface 132, the first electrical contact and first electrode being manufactured from at least one electrically conductive material.

In some cases, second cap 220 can also be of a cylindrical shape and configured to seal the fuse-shaped housing 130 at a second longitudinal end thereof that is opposite the first longitudinal end of the fuse-shaped housing 130. In some cases, second cap 220 can also be configured to include a second electrical contact constituting a second electrode of electrical interface 132, the second electrical contact and second electrode being manufactured from at least one electrically conductive material.

The first pair of heat sinks 230 can be configured to include a first heat sink 232 and a second heat sink 234. In some cases, as illustrated in FIG. 2, the first heat sink 232 and the second heat sink 234 can each be shaped as a semicircle or as a semi-oval.

The second pair of heat sinks 240 can be configured to include a third heat sink 242 and a fourth heat sink 244. In some cases, as illustrated in FIG. 2, the third heat sink 242 and the fourth heat sink 244 can each be shaped as a semicircle or as a semi-oval.

Thermally transparent sleeve 250 can be a cylindrical sleeve. In some cases, the thermally transparent sleeve 250 can be made of one or more of the following materials: germanium, Teflon, silicon, zinc selenide or polyethylene.

Attention is now drawn to FIG. 3, a schematic illustration of one example of thermal radiation emission device 110, in accordance with the presently disclosed subject matter.

In accordance with the presently disclosed subject matter, in some cases, thermal radiation emission device 110 can be configured to include thermal radiation emitting element 120 and a fuse-shaped housing 130, the components of which are detailed earlier herein, inter alia with reference to FIG. 2.

In some cases, the first cap 210 of the fuse-shaped housing 130 can be configured to include a first electrical contact and first electrode of electrical interface 132 that contacts thermal radiation emitting element 120 at a first end thereof.

In some cases, the second cap 220 of the fuse-shaped housing 130 can be configured to include a second electrical contact and second electrode of electrical interface 132 that contacts thermal radiation emitting element 120 at a second end thereof opposite the first end of thermal radiation emitting element 120. That is, the thermal radiation emitting element 120, e.g. including an array of CNTs, extends along a space between two spaced-apart opposite solid surfaces defined by two opposite electrodes. Upon application of a voltage across the first and second electrical contacts of electrical interface 132, an electrical current can be made to flow through the first electrical contact, thermal radiation emitting element 120 and the second electrical contact (in this order, or in the opposite order), thereby causing thermal radiation emitting element 120 to emit thermal radiation for generating part or all of the thermal signature.

In some cases, as illustrated in FIG. 3, the first pair of heat sinks 230 can be connected to the first cap 210. Moreover, in some cases, as illustrated in FIG. 3, part of thermal radiation emitting element 120 can be situated between the first heat sink 232 and the second heat sink 234 (shown in FIG. 2).

In some cases, as illustrated in FIG. 3, the second pair of heat sinks 240 can be connected to the second cap 220. Moreover, in some cases, as illustrated in FIG. 3, part of thermal radiation emitting element 120 can be situated between the third heat sink 242 and the fourth heat sink 244 (shown in FIG. 2).

In some cases, as illustrated in FIG. 3, a first longitudinal end of thermally transparent sleeve 250 can be connected to first cap 210, and a second longitudinal end of thermally transparent sleeve 250, opposite the first longitudinal end of thermally transparent sleeve 250, can be connected to second cap 220. In this manner, thermally transparent sleeve 250 can be configured to surround the components of thermal radiation emission device 110 that are situated longitudinally between the first cap 210 and the second cap 220. It is to be noted that in some cases (not as illustrated in FIG. 3), the first electrode and the second electrode of electrical interface 132 can extend along a length of the thermal radiation emitting element 120. In some cases, as illustrated in FIG. 3, thermally transparent sleeve 250 can be configured to surround the following components of thermal radiation emission device 110: thermal radiation emitting element 120, at least part of first heat sink 232, at least part of second heat sink 234, at least part of third heat sink 242, and at least part of fourth heat sink 244. By surrounding thermal radiation emitting element 120, thermally transparent sleeve 250 can isolate thermal radiation emitting element 120 from the environment external to thermal radiation emission device 110, and thereby protect thermal radiation emitting element 120 from being damaged. It is to be noted that only the ends of the thermal radiation emitting element 120 contact a solid surface, such that a majority of a surface area of the thermal radiation emitting element 120 is not in contact with any solid surface.

In some cases, thermally transparent sleeve 250 can be configured to provide a vacuumed environment for thermal radiation emitting element 120, thereby improving a durability of thermal radiation emitting element 120 and preventing structural failure of thermal radiation emitting element 120 relative to a thermal radiation emitting element 120 in a non-vacuumed environment.

In some cases, thermal radiation emitting element 120 can be configured to comprise an array of CNTs, the array being connected by its two opposite ends to the two opposite electrodes in first cap 210 and second cap 220, respectively, and extending along a space between the electrodes.

In some cases, as illustrated in FIG. 3, thermal radiation emitting element 120 can be configured to have a flat surface. In some cases in which thermal radiation emitting element 120 has a flat surface, fuse-shaped housing 130 can be configured to comprise a marking (not shown), for example a vertical mark along an external surface of first cap 210 or an external surface of second cap 220, the marking instructing a user of the thermal signature generating device 100 of a connection direction of connecting fuse-shaped housing 130 to holder 140. In this manner, thermal radiation emitting element 120 can be situated within thermal signature generation unit 100 at an orientation that enables thermal signature generation unit 100 to direct thermal radiation towards desired directions.

Attention is now drawn to FIG. 4, a schematic illustration of one example of components of a holder 140 that is configured to hold thermal radiation emission device 110, in accordance with the presently disclosed subject matter.

In accordance with the presently disclosed subject matter, in some cases, and as illustrated in FIG. 4, holder 140 can be configured as a fuse holder 140, being a holder 140 that is capable of holding a fuse-shaped housing 130, which is described earlier herein, inter alia with reference to FIGS. 2 and 3.

In some cases, as illustrated in FIG. 4, fuse holder 140 can be configured to include a reflector 145 for directing the thermal radiation that is emitted by thermal radiation emitting element 120 towards desired directions.

In some cases, as illustrated in FIG. 4, fuse holder 140 can be further configured to include a first mounting bracket 420 and a second mounting bracket 430. Moreover, reflector 145 can be configured to be mounted on the first mounting bracket 420 and the second mounting bracket 430, as detailed further herein, inter alia with reference to the present figure and FIG. 5.

In some cases, as illustrated in FIG. 4, fuse holder 140 can also be configured to include a mount 440. Moreover, in some cases, reflector 145 can be configured to be mounted on the first mounting bracket 420, the second mounting bracket 430 and the mount 440, as detailed further herein, inter alia with reference to FIG. 5.

In some cases, as illustrated in FIG. 4, reflector 145 can be configured to have a planar section 411, a first angled section 412 and a second angled section 413. In some cases, as illustrated in FIG. 4, the planar section 411 can be connected between the first angled section 412 and the second angled section 413, such that each of the first angled section 412 and the second angled section 413 are connected to the planar section 411 at an obtuse angle with respect to the planar section 411.

In some cases, as illustrated in FIG. 4, reflector 145 can be configured to include a first continuous cut-out section 414 and a second continuous cut-out section 415. Each of the first continuous cut-out section 414 and the second continuous cut-out section 415 can span part of the first angled section 412, the planar section 411, and part of the second angled section 413, thereby enabling the reflector 145 to be mounted on the first mounting bracket 420 and the second mounting bracket 430, as detailed further herein, inter alia with reference to FIG. 5.

In some cases, as illustrated in FIG. 4, first reflector mounting bracket 420 can be configured to include a first upright component 422, a second upright component 424 and a first planar component 426. Part of the first planar component 426 can be present between the first upright component 422 and the second upright component 424 (e.g., between a bottom end of the first upright component 422 and a bottom end of the second upright component 424, as illustrated in FIG. 4). The first upright component 422 and the second upright component 424 can be connected substantially perpendicularly to the first planar component 426 and opposite to one another along a first traversal planar axis 'y'.

In some cases, fuse holder 140 can be configured to provide electrical current to electrical interface 132 of fuse-shaped housing 130. In some cases, at least part of the first reflector mounting bracket 420 can be electrically conductive, enabling providing an electrical current to electrical interface 132 of fuse-shaped housing 130 via first reflector mounting bracket 420, e.g. based on control signals generated by control unit 150.

Moreover, in some cases, as illustrated in FIG. 4, second reflector mounting bracket 430 can be configured to include a third upright component 432, a fourth upright component 434 and a second planar component 436. Part of the second planar component 436 can be present between the third upright component 432 and the fourth upright component 434 (e.g., between a bottom end of the third upright component 432 and a bottom end of the fourth upright component 434, as illustrated in FIG. 4). The third upright component 432 and the fourth upright component 434 can be connected substantially perpendicularly to the second planar component 436 and opposite to one another along the first traversal planar axis 'y'.

In some cases, at least part of the second reflector mounting bracket 430 can be electrically conductive, enabling providing an electrical current to electrical interface 132 of fuse-shaped housing 130 via second reflector mounting bracket 430, e.g. based on control signals generated by control unit 150.

In some cases, mount 440 can be configured to enable the first reflector mounting bracket 420 and the second reflector mounting bracket 430 to be detachably connected thereto. Moreover, in some cases, mount 440 can be configured to enable part of reflector 145 to be mounted thereon, as discussed earlier herein, and as detailed further herein, inter alia with reference to FIG. 5. The illustration of the mount 440 in FIG. 4 is provided for illustrative purposes only. The mount 440 can be manufactured in any manner that is consistent with the present disclosure.

Attention is now drawn to FIG. 5, a schematic illustration of one example of a thermal signature generating device 100, in accordance with the presently disclosed subject matter.

In accordance with the presently disclosed subject matter, and as detailed earlier herein, inter alia with reference to FIG. 1, in some cases, thermal signature generating device 100 can be configured to include thermal radiation emission device 110 and holder 140, the thermal radiation emission device 110 being configured to include a housing 130 and a thermal radiation emitting element 120 (not illustrated in FIG. 5) held by the housing 130.

In some cases, as detailed earlier herein, inter alia with reference to FIGS. 2 and 3, and as illustrated in FIG. 5, the housing 130 of the thermal radiation emission device 110 can be a fuse-shaped housing 130.

In some cases, as detailed earlier herein, inter alia with reference to FIG. 4, and as illustrated in FIG. 5, holder 140 can be a fuse holder 140 that is capable of holding a fuse-shaped housing 130.

In some cases, as detailed earlier herein, inter alia with reference to FIG. 4, and as illustrated in FIG. 5, fuse holder 140 can be configured to include a reflector 145, first reflector mounting bracket 420, second reflector mounting bracket 430, and mount 440. In some cases, as illustrated in FIG. 5, each of first reflector mounting bracket 420 and second reflector mounting bracket 430 can be detachably connected to mount 440. Moreover, in some cases, as illustrated in FIG. 5, reflector 145 can be mounted on the following: first planar component 426 of first reflector mounting bracket 420, first backstop 442 and second backstop 444 of mount 440, and second planar component 436 of second reflector mounting bracket 430. In addition, in some cases, as illustrated in FIG. 5, reflector 145 can be mounted by lowering the first continuous cut-out section 414 (illustrated in FIG. 4) of reflector 145 over first reflector mounting bracket 420 and lowering the second continuous cut-out section 415 (illustrated in FIG. 4) of reflector 145 over second reflector mounting bracket 430.

In some cases, as illustrated in FIG. 5, fuse-shaped housing 130 can be detachably connected to the fuse holder 140. Moreover, in some cases, as illustrated in FIG. 5, fuse-shaped housing 130 can be detachably connected to the fuse holder 140 such that the fuse-shaped housing 130 is connected between first reflector mounting bracket 420 and second reflector mounting bracket 430; a first longitudinal end of fuse-shaped housing 130 is positioned between first upright component 422 of first reflector mounting bracket 420 and second upright component 424 of first reflector mounting bracket 420; and a second longitudinal end of fuse-shaped housing 130, opposite the first longitudinal end of fuse-shaped housing 130, is positioned between third upright component 432 of second reflector mounting bracket 430 and fourth upright component 434 of second reflector mounting bracket 430.

In some cases, fuse-shaped housing 130 and fuse holder 140 can be configured to meet the DIN 72581 standard.

In some cases, fuse holder 140 can be connected to a reflective surface (not shown) for reflecting the thermal radiation towards desired directions, as an alternative to the fuse holder 140 comprising a reflector 145. Specifically, fuse holder 140 can be located within a substrate of the reflective surface, the substrate being designed to reflect thermal radiation towards the desired directions. Accordingly, upon connecting thermal radiation emission device 110 to the fuse holder 140, the thermal radiation emission device 110 is located within the substrate of the reflective surface, resulting in the thermal radiation emitted by thermal radiation emission device 110 being reflected towards desired directions.

Figure 6A:
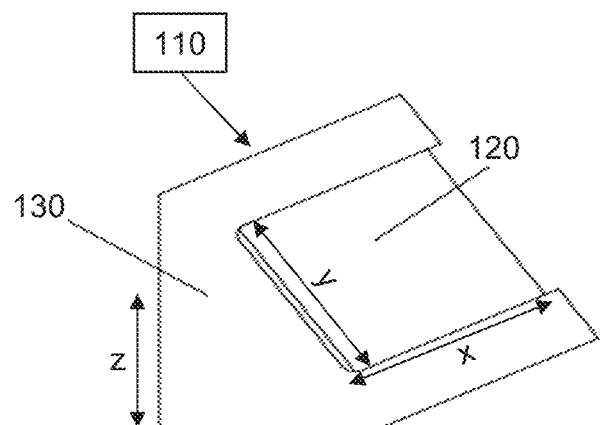
FIGS. 6A and 6B are schematic illustrations of one example of a front-end view and a back-end view, respectively, of a thermal radiation emission device having a thermal radiation emitting element, in accordance with the presently disclosed subject matter.
Figure 6B:
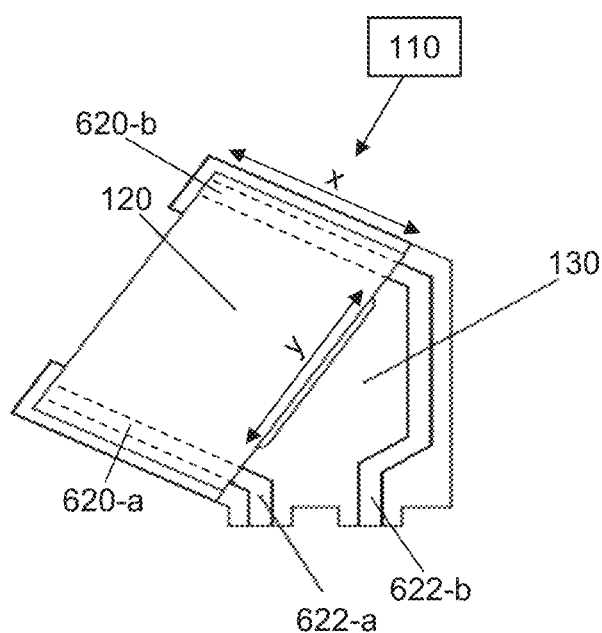

Attention is now drawn to FIGS. 6A and 6B, schematic illustrations of one example of a front-end view and a back-end view, respectively, of a thermal radiation emission device 110 having a thermal radiation emitting element 120, in accordance with the presently disclosed subject matter.

In accordance with the presently disclosed subject matter, in some cases, thermal radiation emission device 110 can be configured to include a thermal radiation emitting element 120 that is attached to a housing 130, being, for example, a printed circuit board (PCB). The thermal radiation emitting element 120 can be at an angle between 0° and 90° from vertical axis 'z'.

In some cases, the thermal radiation emitting element 120 can comprise an array of CNTs.

Thermal radiation emitting element 120 can extend between two spaced-apart opposite solid surfaces defined by two opposite electrodes 620-a and 620-b, respectively. The thermal radiation emitting element 120 can be connected by its two opposite ends to the two opposite electrodes 620-a and 620-b, respectively, and can extend along the space between the electrodes 620-a and 620-b, as illustrated in FIG. 6B. In some cases in which the thermal radiation emitting element 120 comprises an array of CNTs, the array of CNTs can be connected by its two opposite ends to the two opposite electrodes 620-a and 620-b, respectively, and can extend along the space between the electrodes 620-a and 620-b.

In some cases, as illustrated in FIGS. 6A and 6B, a majority of a surface area of the thermal radiation emitting element 120 is not in contact with any solid surface.

In some cases, as illustrated in FIGS. 6A and 6B, the thermal radiation emitting element 120 can be configured with an aspect ratio between cross-sectional dimensions of two surface regions of the two electrodes 620-a and 620-b on which the ends of the thermal radiation emitting element 120 are mounted and lengths of the thermal radiation emitting element 120 defined by the space between the electrodes 620-a and 620-b, the cross sectional dimension 'x' of each of the two surface regions being larger than the space 'y' between the electrodes 620-a and 620-b. In some cases in which the thermal radiation emitting element 120 comprises an array of CNTs, the array of CNTs can be configured with an aspect ratio between cross-sectional dimensions of the two surface regions of the two electrodes 620-a and 620-b on which the ends of the array are mounted and a length of the array defined by the space between the electrodes 620-a and 620-b, the cross sectional dimension 'x' of each of said two surface regions being larger than the space 'y' between the electrodes 620-a and 620-b.

Thermal radiation emission device 110 can be configured to include a first electrical connector 622-a that connects to the electrode 620-a, and a second electrical connector 622-b that connects to the electrode 620-b.

In some cases in which the thermal radiation emitting element 120 comprises an array of CNTs, the electrical current through the thermal radiation emitting element 120 can flow along a direction 'y' between the electrodes 620-a and 620-b in alignment with the lengths of fibers of the CNTs.

As illustrated in FIG. 6B, in some cases, the electrodes 620-a and 620-b can be configured to serve as heat sinks for removing heat generated by the thermal radiation emitting element 120.

In some cases, in which the aspect ratio between cross sectional dimensions 'x' of each of the two surface regions of the electrodes 620-a and 620-b is larger than the space 'y' between the electrodes 620-a and 620-b, as illustrated in FIGS. 6A and 6B, this aspect ratio enables the thermal radiation emitting element 120 to optimally use the electrical energy that it is provided for heating thermal radiation emitting element 120, since it allows for a maximum surface area for the electrodes 620-a and 620-b while limiting energy loss. Moreover, thermal radiation emitting element 120 can be cooled off more quickly than if the space 'y' is greater than the cross sectional dimension 'x'. Additionally, the thermal radiation emitting element 120 illustrated in FIGS. 6A and 6B can be cooled off more quickly since the space 'y' between the electrodes is not in contact with any solid uncooled surface. This aspect ratio ('x'>'y') can also enable the at least one thermal radiation emitting element 120 to emit thermal radiation at a higher pulse rate than if the aspect ratio was such that the cross-sectional dimension 'x' is less than the space 'y'.

In some cases, thermal signature generating device 100 can be configured to include one thermal radiation emission device 110 having one thermal radiation emitting element 120. In such cases, thermal radiation emission device 110 can be configured to include control unit 150, configured and operable to generate control signals to control the electric current through the thermal radiation emitting element 120 in accordance with the thermal signature to be generated.

Alternatively, in some cases, thermal signature generating device 100 can be configured to include a plurality of thermal radiation emission devices 110 having a corresponding plurality of thermal radiation emitting elements 120. In such cases, thermal signature generating device 100 can be configured to include the control unit 150, configured and operable to generate control signals to control the electric current through the plurality of thermal radiation emitting elements 120 in accordance with the thermal signature to be generated.

Figure 7A:
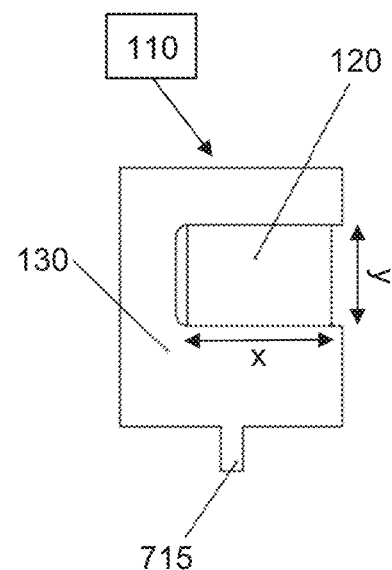
FIGS. 7A and 7B are schematic illustrations of another example of a front-end view and a back-end view, respectively, of another thermal radiation emission device having a thermal radiation emitting element, in accordance with the presently disclosed subject matter.
Figure 7B:
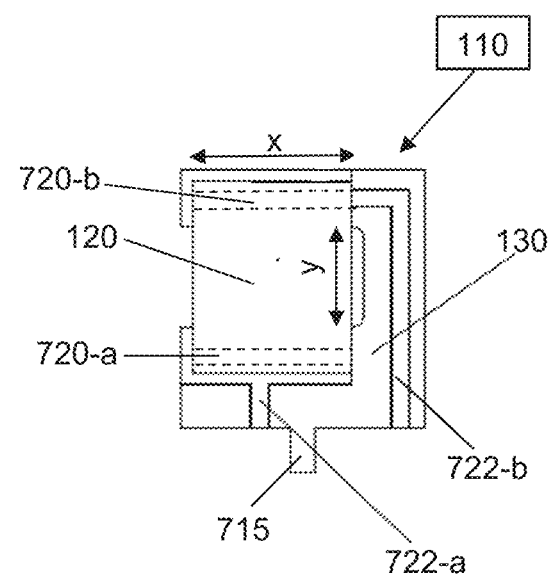

Attention is now drawn to FIGS. 7A and 7B, schematic illustrations of another example of a front-end view and a back-end view, respectively, of another thermal radiation emission device 110 having a thermal radiation emitting element 120, in accordance with the presently disclosed subject matter.

In accordance with the presently disclosed subject matter, in some cases, thermal radiation emission device 110 can be configured to include a thermal radiation emitting element 120 that is attached to a housing 130, being, for example, a printed circuit board (PCB). In some cases, the housing 130 can be configured to include a male connector 715 enabling detachably connecting the thermal radiation emission device 110 to a female connector irrespective of an angle of rotation of the male connector 715 around an axis of the male connector 715 perpendicular to the female connector.

In some cases, the thermal radiation emitting element 120 can be configured to include an array of CNTs.

Thermal radiation emitting element 120 can extend between two spaced-apart opposite solid surfaces defined by two opposite electrodes 720-a and 720-b, respectively. The thermal radiation emitting element 120 can be connected by its two opposite ends to the two opposite electrodes 720-a and 720-b, respectively, and can extend along the space between the electrodes 720-a and 720-b, as illustrated in FIG. 7B. In some cases in which the thermal radiation emitting element 120 comprises an array of CNTs, the array of CNTs can be connected by its two opposite ends to the two opposite electrodes 720-*a* and 720-*b*, respectively, and can extend along the space between the electrodes 720-*a* and 720-*b*.

In some cases, as illustrated in FIGS. 7A and 7B, a majority of a surface area of the thermal radiation emitting element 120 is not in contact with any solid surface.

In some cases, as illustrated in FIGS. 7A and 7B, the thermal radiation emitting element 120 can be configured with an aspect ratio between cross-sectional dimensions of two surface regions of the two electrodes 720-*a* and 720-*b* on which the ends of the thermal radiation emitting element 120 are mounted and a length of the thermal radiation emitting element 120 defined by the space between the electrodes 720-*a* and 720-*b*, the cross sectional dimension 'x' of each of the two surface regions being larger than the space 'y' between the electrodes 720-*a* and 720-*b*. In some cases in which the thermal radiation emitting element 120 comprises an array of CNTs, the array of CNTs can be configured with an aspect ratio between cross-sectional dimensions of the two surface regions of the two electrodes 720-*a* and 720-*b* on which the ends of the array are mounted and lengths of the array defined by the space between the electrodes 720-*a* and 720-*b*, the cross sectional dimension 'x' of each of the two surface regions being larger than the space 'y' between the electrodes 720-*a* and 720-*b*.

Moreover, in some cases in which the thermal radiation emitting element 120 comprises an array of CNTs, the electrical current through the thermal radiation emitting element 120 can flow along a direction 'y' between the electrodes 720-*a* and 720-*b* in alignment with the lengths of fibers of the CNTs.

As illustrated in FIG. 7B, in some cases, the electrodes 720-*a* and 720-*b* can be configured to serve as heat sinks for removing heat generated by the thermal radiation emitting element 120.

In some cases, in which the aspect ratio between cross sectional dimensions 'x' of each of the two surface regions is larger than the space 'y' between the electrodes 720-*a* and 720-*b*, as illustrated in FIGS. 7A and 7B, this aspect ratio enables the thermal radiation emitting element 120 to optimally use the electrical energy that it is provided for heating thermal radiation emitting element 120, since it allows for a maximum surface area for the electrodes 620-*a* and 620-*b* while limiting energy loss. Moreover, thermal radiation emitting element 120 can be cooled off more quickly than if the space 'y' is greater than the cross sectional dimension 'x'. Additionally, the thermal radiation emitting element 120 illustrated in FIGS. 7A and 7B can be cooled off more quickly since the space 'y' between the electrodes is not in contact with any solid uncooled surface. This aspect ratio ('x'>'y') can also enable the at least one thermal radiation emitting element 120 to emit thermal radiation at a higher pulse rate than if the aspect ratio was such that the cross-sectional dimensions 'x' are less than the space 'y'.

In some cases, thermal signature generating device 100 can be configured to include one thermal radiation emission device 110 having one thermal radiation emitting element 120. In such cases, thermal radiation emission device 110 can be configured to include control unit 150, configured and operable to generate control signals to control the electric current through the thermal radiation emitting element 120 in accordance with the thermal signature to be generated.

Alternatively, in some cases, thermal signature generating device 100 can be configured to include a plurality of thermal radiation emission devices 110 having a corresponding plurality of thermal radiation emitting elements 120. In such cases, thermal signature generating device 100 can be configured to include the control unit 150, configured and operable to generate control signals to control the electric current through the plurality of thermal radiation emitting elements 120 in accordance with the thermal signature to be generated.

Figure 8A:
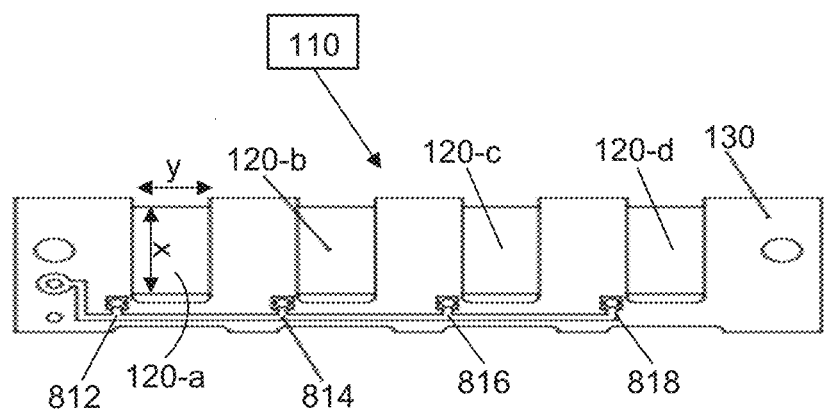
FIGS. 8A and 8B are schematic illustrations of one example of a front-end view and a back-end view, respectively, of a thermal radiation emission device having a series of thermal radiation emitting elements, in accordance with the presently disclosed subject matter.
Figure 8B:
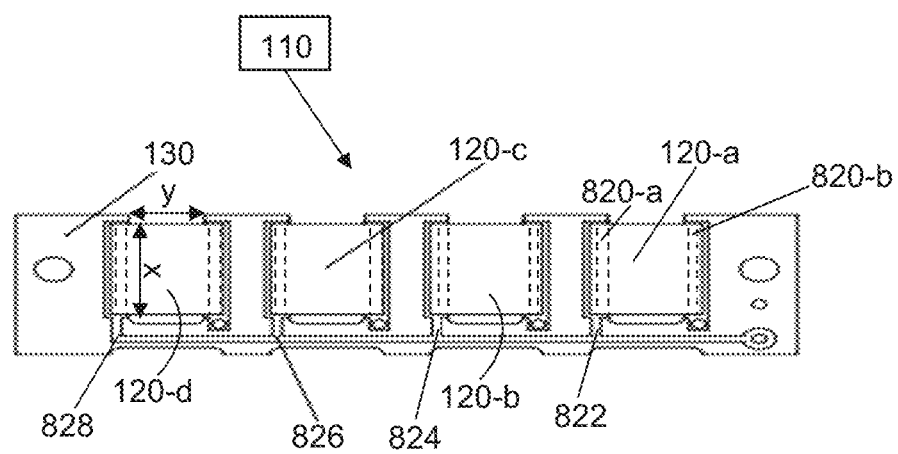

Attention is now drawn to FIGS. 8A and 8B, schematic illustrations of one example of a front-end view and a back-end view, respectively, of a thermal radiation emission device 110 having a series of thermal radiation emitting elements (e.g., 120-*a*, 120-*b*, 120-*c*, 120-*d*), in accordance with the presently disclosed subject matter.

In accordance with the presently disclosed subject matter, in some cases, thermal radiation emission device 110 can be configured to include a series of thermal radiation emitting elements (e.g., 120-*a*, 120-*b*, 120-*c*, 120-*d*) and a housing 130. Each of the thermal radiation emitting elements (e.g., 120-*a*, 120-*b*, 120-*c*, 120-*d*) can be connected between a respective two solid surfaces of the housing 130, as detailed below. In some cases, housing 130 can be a printed circuit board (PCB).

Each of the thermal radiation emitting elements (e.g., 120-*a*, 120-*b*, 120-*c*, 120-*d*) can be configured to extend between two spaced-apart opposite solid surfaces defined by two opposite electrodes. To illustrate this, attention is drawn to FIG. 8B, which illustrates thermal radiation emitting element 120-*a* extending between two spaced-apart opposite solid surfaces defined by two opposite electrodes 820-*a* and 820-*b*. As is illustrated in FIG. 8B, all remaining thermal radiation emitting elements (e.g., 120-*b*, 120-*c*, 120-*d*) in the thermal radiation emission device 110 also extend between two spaced-apart opposite solid surfaces defined by two opposite electrodes, each electrode of the opposite electrodes being illustrated in FIG. 8B by two parallel and closely-spaced dashed lines.

As illustrated in FIG. 8B, each of the thermal radiation emitting elements (e.g., 120-*a*, 120-*b*, 120-*c*, 120-*d*) can be connected by its two opposite ends to its associated two opposite electrodes, respectively, and can extend along a space between the electrodes (e.g., being of a length 'y').

In some cases, each of the thermal radiation emitting elements (e.g., 120-*a*, 120-*b*, 120-*c*, 120-*d*) can comprise an array of CNTs, the array being connected by its two opposite ends to respective two opposite electrodes, respectively, and extending along a space between the electrodes (e.g., being of a length 'y').

In some cases, as illustrated in FIGS. 8A and 8B, a majority of a surface area of each of the thermal radiation emitting elements (e.g., 120-*a*, 120-*b*, 120-*c*, 120-*d*) is not in contact with any solid surface.

In some cases, as illustrated in FIGS. 8A and 8B, each thermal radiation emitting element (e.g., 120-*a*) can be configured with an aspect ratio between cross-sectional dimensions of two surface regions of the two electrodes (e.g., 820-*a* and 820-*b*) on which the ends of the respective thermal radiation emitting element (e.g., 120-*a*) is mounted and a length of the respective thermal radiation emitting element (e.g., 120-*a*) defined by the space between the electrodes (e.g., 820-*a* and 820-*b*), the cross sectional dimension 'x' of each of said two surface regions being larger than the space 'y' between the electrodes (e.g., 820-*a* and 820-*b*). In some cases in which each of the thermal radiation emitting elements (e.g., 120-*a*, 120-*b*, 120-*c*, 120-*d*) comprises an array of CNTs, the array of CNTs of each respective thermal radiation emitting element (e.g., 120-*a*)

can be configured with an aspect ratio between cross-sectional dimensions of the two surface regions of the two electrodes (e.g., 820-*a* and 820-*b*) on which the ends of the array are mounted and a length of the array defined by the space 'y' between the electrodes (e.g., 820-*a* and 820-*b*), the cross sectional dimension 'x' of each of the two surface regions being larger than the space 'y' between the electrodes (e.g., 820-*a* and 820-*b*).

Moreover, in some cases in which each of the thermal radiation emitting elements (e.g., 120-*a*, 120-*b*, 120-*c*, 120-*d*) comprises an array of CNTs, the electrical current through a respective thermal radiation emitting element (e.g., 120-*a*) can flow along a direction 'y' between the electrodes (e.g., 820-*a* and 820-*b*) to which the respective thermal radiation emitting element (e.g., 120-*a*) is affixed, in alignment with the lengths of fibers of the CNTs.

As illustrated in FIG. 8B, in some cases, the electrodes (e.g., 820-*a* and 820-*b*) to which each of the thermal radiation emitting elements (e.g., 120-*a*, 120-*b*, 120-*c*, 120-*d*) is affixed can be configured to serve as heat sinks for removing heat generated by their associated thermal radiation emitting element (e.g., 120-*a*).

In some cases, in which the aspect ratio for each thermal radiation emitting element (e.g., 120-*a*) between cross sectional dimensions 'x' of each of the two surface regions of the electrodes (e.g., 820-*a* and 820-*b*) is larger than the space 'y' between the electrodes (e.g., 820-*a* and 820-*b*), as illustrated in FIGS. 8A and 8B, each thermal radiation emitting element (e.g., 120-*a*) can optimally use the electrical energy that it is provided for heating the respective thermal radiation emitting element (e.g., 120-*a*), since it allows for a maximum surface area for the electrodes (e.g., 820-*a* and 820-*b*) while limiting energy loss. Moreover, each thermal radiation emitting element (e.g., 120-*a*) can be cooled off more quickly than if the space 'y' is greater than the cross sectional dimension 'x'. The space 'y' being less than the cross sectional dimension 'x' for each thermal radiation emitting element (e.g., 120-*a*) is made possible by providing a thermal radiation emission device 110 that include a series of thermal radiation emitting elements (e.g., 120-*a*, 120-*b*, 120-*c*, 120-*d*), each thermal radiation emitting element of the thermal radiation emitting elements (e.g., 120-*a*, 120-*b*, 120-*c*, 120-*d*) extending between two spaced-apart opposite solid surfaces defined by two opposite electrodes, instead of providing a thermal radiation emission device 110 that includes one large thermal radiation emitting element. Moreover, the thermal radiation emitting elements (e.g., 120-*a*, 120-*b*, 120-*c*, 120-*d*) can be cooled off more quickly since the space 'y' between the electrodes associated with each of the thermal radiation emitting elements (e.g., 120-*a*, 120-*b*, 120-*c*, 120-*d*) is not in contact with any solid uncooled surface. In addition, by providing an aspect ratio for each thermal radiation emitting element (e.g., 120-*a*) between cross sectional dimensions 'x' of each of the two surface regions of the electrodes (e.g., 820-*a* and 820-*b*) that is larger than the space 'y' between the electrodes (e.g., 820-*a* and 820-*b*), the thermal radiation emitting elements (e.g., 120-*a*, 120-*b*, 120-*c*, 120-*d*) can emit thermal radiation at a higher pulse rate than if the aspect ratio was such that the cross-sectional dimensions 'x' are less than the space 'y'.

As illustrated in FIGS. 8A and 8B, the two opposite electrodes that are connected to each of the thermal radiation emitting elements (e.g., 120-*a*, 120-*b*, 120-*c*, 120-*d*) can be connected to respective electrical connections. For example, in the illustration of FIG. 8A, a front-end of the housing 130 includes electrical connections 812, 814, 816 and 818. Moreover, in the illustration of FIG. 8B, a back-end of the housing 130 includes electrical connections 822, 824, 826 and 828. The opposite electrodes of thermal radiation emitting element 120-*a* are connected to electrical connections 812 and 822, respectively; the opposite electrodes of thermal radiation emitting element 120-*b* are connected to electrical connections 814 and 824, respectively; the opposite electrodes of thermal radiation emitting element 120-*c* are connected to electrical connections 816 and 826, respectively; and the opposite electrodes of thermal radiation emitting element 120-*d* are connected to electrical connections 818 and 828, respectively.

Control unit 150 (not illustrated in FIGS. 8A and 8B) can be configured and operable to generate control signals to control the electrical current through each of the thermal radiation emitting elements (e.g., 120-*a*, 120-*b*, 120-*c*, 120-*d*), in accordance with the thermal signature to be generated.

Figure 9A:
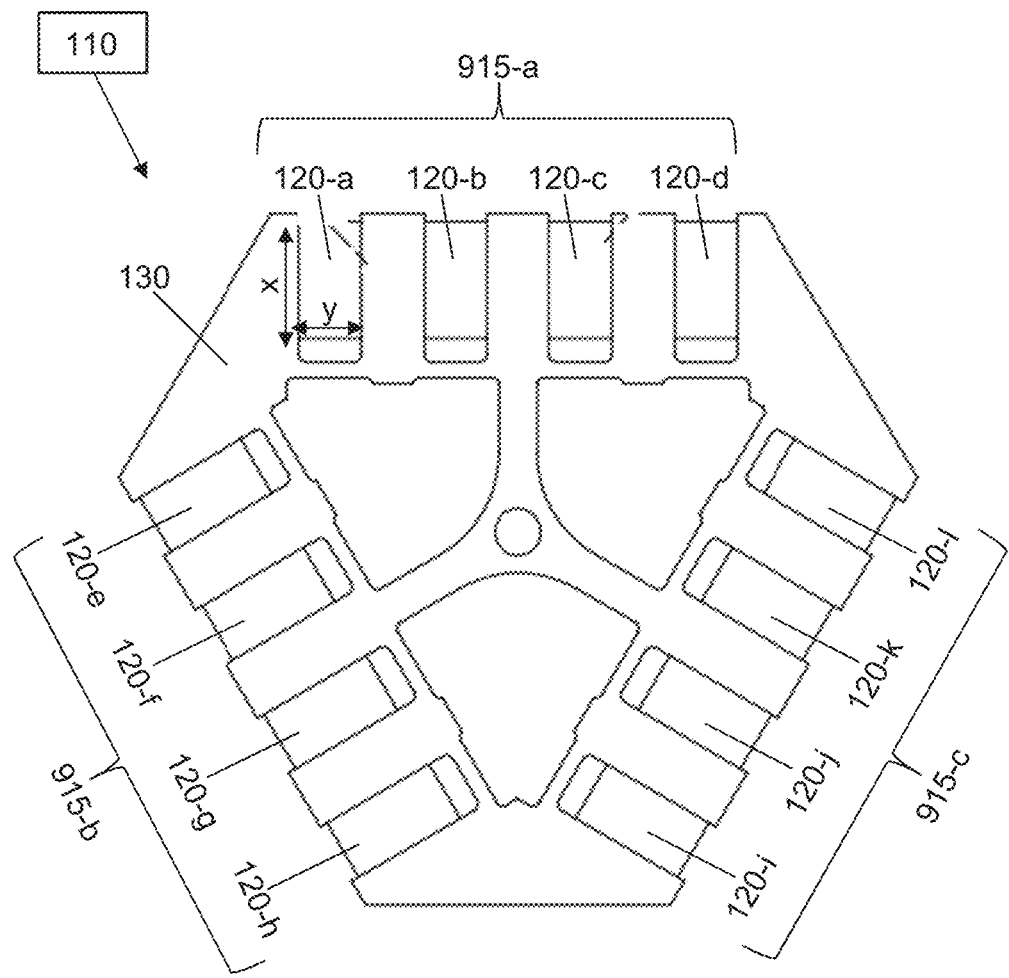
FIGS. 9A and 9B are schematic illustrations of one example of a front-end view and a back-end view, respectively, of a thermal radiation emission device having a plurality of thermal radiation emitting elements in a disk configuration, in accordance with the presently disclosed subject matter.
Figure 9B:
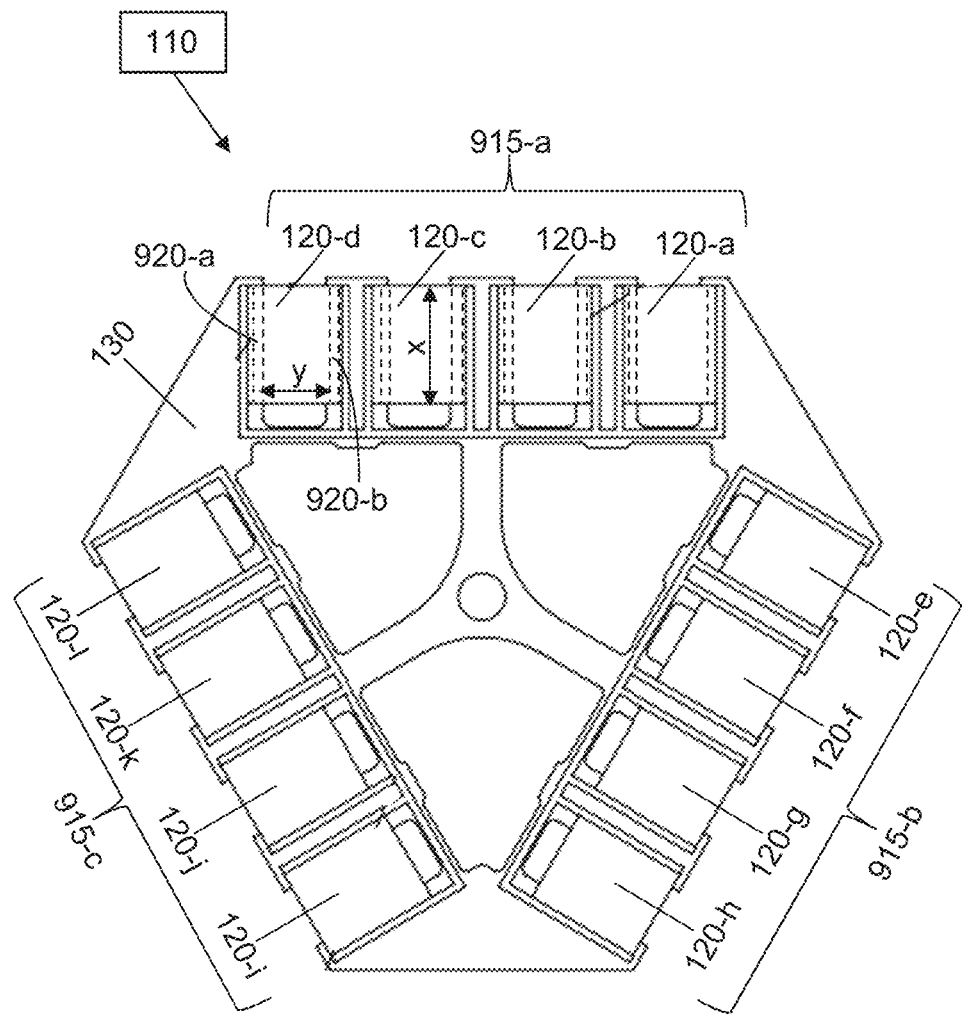

Attention is now drawn to FIGS. 9A and 9B, schematic illustrations of one example of a front-end view and a back-end view, respectively, of a thermal radiation emission device 110 having a plurality of thermal radiation emitting elements 120 in a disk configuration, in accordance with the presently disclosed subject matter.

In accordance with the presently disclosed subject matter, in some cases, thermal radiation emission device 110 can be configured to include a plurality of thermal radiation emitting elements 120, wherein at least one thermal radiation emitting element (e.g., 120-*a*) of the thermal radiation emitting elements 120 faces a first direction and is operable to emit first thermal radiation in the first direction, and at least another thermal radiation emitting element (e.g., 120-*e*) of the thermal radiation emitting elements 120 faces a second direction, other than the first direction, and is operable to emit second thermal radiation in the second direction.

An example of such a thermal radiation emission device 110 is illustrated in FIGS. 9A and 9B. In the illustrations of FIGS. 9A and 9B, thermal radiation emission device 110 includes a housing 130 having a disk configuration, the housing 130 including three sides (e.g., 915-*a*, 915-*b*, 915-*c*). Each side of the sides (e.g., 915-*a*, 915-*b*, 915-*c*) includes a plurality of thermal radiation emitting elements 120 that face a given direction, wherein the thermal radiation emitting elements 120 that are housed in each side of the sides (e.g., 915-*a*, 915-*b*, 915-*c*) face a different direction than the thermal radiation emitting elements 120 that are housed in other sides of the sides (e.g., 915-*a*, 915-*b*, 915-*c*). In the illustrations of FIGS. 9A and 9B, a first side 915-*a* of the housing 130 includes thermal radiation emitting elements 120-*a*, 120-*b*, 120-*c* and 120-*d* that face a first direction and are operable to emit thermal radiation in the first direction. Moreover, a second side 915-*b* of the housing 130 includes thermal radiation emitting elements 120-*e*, 120-*f*, 120-*g* and 120-*h* that face a second direction, other than the first direction, and are operable to emit thermal radiation in the second direction. In addition, a third side 915-*c* of the housing 130 includes thermal radiation emitting elements 120-*i*, 120-*j*, 120-*k* and 120-*l* that face a third direction, other than the first direction and the second direction, and are operable to emit thermal radiation in the third direction.

Each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can be connected between a respective two solid surfaces of the housing 130, as detailed below. In some cases, housing 130 can be a printed circuit board (PCB).

Each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can extend between two spaced-apart opposite solid surfaces defined by two opposite electrodes, as detailed earlier herein, inter alia with reference to FIGS. 8A and 8B.

Moreover, each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can be connected by its two opposite ends to its associated two opposite electrodes, respectively, and can extend along a space between the electrodes (e.g., being of a length 'y').

In some cases, each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can comprise an array of CNTs, the array being connected by its two opposite ends to respective two opposite electrodes, respectively, and extending along a space between the electrodes (e.g., being of a length 'y').

In some cases, as illustrated in FIGS. 9A and 9B, a majority of a surface area of each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) is not in contact with any solid surface. In some cases, as illustrated in FIG. 9B, each thermal radiation emitting element (e.g., 120-*d*) can be configured with an aspect ratio between cross-sectional dimensions of two surface regions of the two electrodes (e.g., 920-*a* and 920-*b*) on which the ends of the respective thermal radiation emitting element (e.g., 120-*d*) is mounted and a length of the respective thermal radiation emitting element (e.g., 120-*d*) defined by the space between the electrodes (e.g., 920-*a* and 920-*b*), the cross sectional dimension 'x' of each of said two surface regions being larger than the space 'y' between the electrodes (e.g., 920-*a* and 920-*b*). In some cases in which each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) comprises an array of CNTs, the array of CNTs of each respective thermal radiation emitting element (e.g., 120-*d*) can be configured with an aspect ratio between cross-sectional dimensions of the two surface regions of the two electrodes (e.g., 920-*a* and 920-*b*) on which the ends of the array are mounted and a length of the array defined by the space 'y' between the electrodes (e.g., 920-*a* and 920-*b*), the cross sectional dimension 'x' of each of the two surface regions 'x' being larger than the space 'y' between the electrodes (e.g., 920-*a* and 920-*b*).

Moreover, in some cases in which each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) comprises an array of CNTs, the electrical current through a respective thermal radiation emitting element (e.g., 120-*d*) can flow along a direction 'y' between the electrodes (e.g., 920-*a* and 920-*b*) to which the respective thermal radiation emitting element (e.g., 120-*d*) is affixed, in alignment with the lengths of fibers of the CNTs.

As illustrated in FIG. 9B, in some cases, the electrodes (e.g., 920-*a* and 920-*b*) to which each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) is affixed can be configured to serve as heat sinks for removing heat generated by their associated thermal radiation emitting element (e.g., 120-*d*).

In some cases, in which the aspect ratio for each thermal radiation emitting element (e.g., 120-*a*) between cross sectional dimensions 'x' of each of the two surface regions of the electrodes (e.g., 920-*a* and 920-*b*) is larger than the space 'y' between the electrodes (e.g., 920-*a* and 920-*b*), each thermal radiation emitting element (e.g., 120-*d*) can optimally use the electrical energy that it is provided for heating the respective thermal radiation emitting element (e.g., 120-*d*), since it allows for a maximum surface area for the electrodes (e.g., 920-*a* and 920-*b*) while limiting energy loss. Moreover, each thermal radiation emitting element (e.g., 120-*d*) can be cooled off more quickly than if the space 'y' is greater than the cross sectional dimension 'x'. The space 'y' being less than the cross sectional dimension 'x' for each thermal radiation emitting element (e.g., 120-*a*) is made possible by providing a thermal radiation emission device 110 that include a plurality of series of thermal radiation emitting elements (e.g., series of thermal radiation emitting elements 120-*a*, 120-*b*, 120-*c*, 120-*d*), each thermal radiation emitting element of the thermal radiation emitting elements in each series (e.g., 120-*a*, 120-*b*, 120-*c*, 120-*d*) extending between two spaced-apart opposite solid surfaces defined by two opposite electrodes, instead of providing a thermal radiation emission device 110 that includes one large thermal radiation emitting element at each side of the housing 130 have the disk configuration. Moreover, the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can be cooled off more quickly since the space 'y' between the electrodes associated with each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) is not in contact with any solid uncooled surface. In addition, by providing an aspect ratio for each thermal radiation emitting element (e.g., 120-*a*) between cross sectional dimensions 'x' of each of the two surface regions of the electrodes (e.g., 820-*a* and 820-*b*) that is larger than the space 'y' between the electrodes (e.g., 820-*a* and 820-*b*), the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can emit thermal radiation at a higher pulse rate than if the aspect ratio was such that the cross-sectional dimensions 'x' are less than the space 'y'.

The two opposite electrodes that are connected to each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*) can be connected to respective electrical connections (not shown in FIGS. 9A and 9B).

Control unit 150 (not illustrated in FIGS. 9A and 9B) can be configured and operable to generate control signals to control the electrical current through each of the thermal radiation emitting elements (e.g., 120-*a*, 120-*b*, 120-*c*, 120-*d*, 120-*e*, 120-*f*, 120-*g*, 120-*h*, 120-*i*, 120-*j*, 120-*k*, 120-*l*), in accordance with the thermal signature to be generated.

Attention is now drawn to FIG. 10, a flowchart illustrating an example of a method 1000 for generating a thermal signature, in accordance with the presently disclosed subject matter.

In accordance with the presently disclosed subject matter, two opposite electrodes of an electrical interface 132 of housing 130 can be configured to provide electrical current through at least one thermal radiation emitting element 120, causing the at least one thermal radiation emitting element 120 to emit thermal radiation for generating the thermal signature, wherein each of the at least one thermal radiation emitting elements 120 extends between two spaced-apart opposite solid surfaces defined by two opposite electrodes and comprises an array of Carbon Nanotubes (CNTs), the array being connected by its two opposite ends to said two opposite electrodes, respectively, and extending along a space between the electrodes, the electrodes providing the electrical current through the thermal radiation emitting element 120 (block 1004).

It is to be noted that, with reference to FIG. 10, the block can be broken down to a few blocks and/or other blocks may be added. Furthermore, whilst the flowchart is described also with reference to the system elements that realizes them, this is by no means binding, and the block can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A device for generating a thermal signature, the device comprising:
   a housing; and
   a thermal radiation emitting element made of Carbon Nanotubes (CNT) within the housing;
   wherein the housing comprises an electrical interface connected to the thermal radiation emitting element for receiving electrical current causing the thermal radiation emitting element to emit thermal radiation for generating the thermal signature, and wherein at least part of the housing enables thermal radiation passage therethrough; and
   wherein the device is shaped as a fuse enabling detachably connecting the device to a fuse holder.

2. The device of claim 1, wherein the housing further comprises at least one heat sink for removing heat generated by the thermal radiation emitting element.

3. The device of claim 1, wherein the housing provides a vacuumed environment for the thermal radiation emitting element.

4. The device of claim 1, wherein the thermal radiation emitting element has one of the following shapes: a spiral, a cylinder, a fiber or a flat surface.

5. The device of claim 1, wherein the at least part of the housing that enables thermal radiation passage therethrough is made of one or more of the following materials: glass, germanium, or polyethylene.

6. The device of claim 1, wherein the shape of the thermal radiation emitting element is a flat surface, and wherein the housing comprises a marking instructing a user of a connection direction of connecting the housing to the fuse holder for providing thermal radiation at desired directions.

7. The device of claim 1, wherein the device and the fuse holder meet the DIN 72581 standard.

8. The device of claim 1, wherein the fuse holder is capable of providing the electrical current to the electrical interface.

9. The device of claim 1, wherein the fuse holder comprises a reflector for directing the thermal radiation towards desired directions.

10. The device of claim 1, wherein the fuse holder is connected to a reflective surface for reflecting the thermal radiation towards desired directions.

11. The device of claim 10, wherein upon connecting the device to the fuse holder, the device is located within a substrate of the reflective surface, the substrate being designed to reflect the thermal radiation towards the desired directions.

12. A system comprising:
   one or more devices in accordance with claim 1; and
   a controller configured to control generation of a thermal signature by the one or more devices for marking one or more objects.

13. The system of claim 12, wherein the controller controls the generation of the thermal signature by the one or more devices in accordance with a pre-defined pattern.

14. A non-transitory computer readable storage medium having computer readable program code embodied therewith, the computer readable program code, executable by a controller of a computer to perform a method for generating a thermal signature by a device comprising a housing and a thermal radiation emitting element made of Carbon Nanotubes (CNT) within the housing, the method comprising:
   receiving an electrical current at an electrical interface of the housing, the electrical interface being connected to the thermal radiation emitting element causing the thermal radiation emitting element to emit thermal radiation for generating the thermal signature, wherein at least part of the housing enables thermal radiation passage therethrough; and
   wherein the device is shaped as a fuse enabling detachably connecting the device to a fuse holder.

* * * * *